US006555783B2

(12) United States Patent
Koide (10) Patent No.: US 6,555,783 B2
(45) Date of Patent: Apr. 29, 2003

(54) LASER PROCESSING METHOD AND LASER PROCESSING APPARATUS

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/770,463

(22) Filed: Jan. 29, 2001

(65) Prior Publication Data

US 2001/0050312 A1 Dec. 13, 2001

(30) Foreign Application Priority Data

Feb. 3, 2000 (JP) ........................................ 2000-025904
Feb. 3, 2000 (JP) ........................................ 2000-025974
Feb. 3, 2000 (JP) ........................................ 2000-025983
Feb. 3, 2000 (JP) ........................................ 2000-025992
Feb. 3, 2000 (JP) ........................................ 2000-025998

(51) Int. Cl.⁷ ............................................. B23K 26/06
(52) U.S. Cl. ............................ 219/121.73; 219/121.69; 219/121.85
(58) Field of Search ...................... 219/121.73, 121.69, 219/121.85, 121.82, 121.68, 121.67

(56) References Cited

U.S. PATENT DOCUMENTS 5,703,631 A * 12/1997 Hayes et al. ................. 347/47
6,040,552 A * 3/2000 Jain et al. ................. 219/121.7
6,281,471 B1 * 8/2001 Smart .................... 219/121.62
6,333,485 B1 * 12/2001 Haight et al. .......... 219/121.68

* cited by examiner

Primary Examiner—M. Alexandra Elve
(74) Attorney, Agent, or Firm—Fitzpatrick, Cella, Harper & Scinto (57) ABSTRACT

A laser processing method, which uses laser beam from a laser oscillator to emit continuously light pulse having large spacial and temporal energy concentration in a pulse emission period of one picosecond or less, and projects a mask pattern with a projection lens onto a work piece almost transparent to the wavelength of the laser beam for sublimation processing thereof, has the steps of setting the focal point of projecting image of the mask pattern on the surface of contour boundary on the opposite side of the work piece irradiated by the laser when the processing begins, at the same time, irradiating and converging the laser beam on the focal point portion so as to make the energy concentration thereof to be more than the threshold value enabling designated ablative action to be generated, moving the work piece in the direction of laser irradiation gradually in a designated amount or at a designated speed in synchronism with the progress of ablation processing by the irradiation of the laser beam, and forming structure on the work piece in the form of being inserted into and drawn from the contour boundary surface on the opposite side of laser irradiation.

18 Claims, 7 Drawing Sheets

LASER PROCESSING METHOD AND LASER PROCESSING APPARATUS

BACKGROUND OF THE INVENTION

1. Field of the Invention

The present invention relates to a laser processing method that uses a laser beam for the structural formation of a work piece, and also, relates to a laser processing apparatus therefor.

Further, the invention relates to a laser processing method and a laser processing apparatus preferably suitable for micro-processing of materials used for a micromachine, or ICs and diode devices, among some others.

2. Related Background Art

Conventionally, as means for processing a minute three-dimensional structure of a submicron to 10 micron order, it has usually been practiced to use a lithographic process. For such a process, a method has been adopted for processing a structure through a series of etching, resist ashing, and others that utilize resist coating, resist patterning exposure, resist development, and resist patterns.

However, for the lithographic process described above which is used for processing a minute three-dimensional structure of a submicron to 10 micron order, the processing steps become complicated so as to create not only a problem related to costs against tact-time, but also, a problem of an enormous amount of investment in constructing production facilities. Then, furthermore, it is extremely difficult for the lithographic process to form a structure having a high aspect ratio.

SUMMARY OF THE INVENTION

The present invention is designed with a view towards solving the problems discussed above, and is aimed at the provision of laser processing methods, as well as a laser processing apparatus, to provide simple and easy processing steps in which a three-dimensional micro-structure is processed without using any complicated processing steps such as lithographic processing steps.

In order to achieve the objectives, the laser processing methods of the present invention are provided as given in the following paragraphs (1) to (19), and a laser processing apparatus in (20) to (24):

(1) A laser processing method, which uses a laser beam from a laser oscillator to emit, continuously, a light pulse having a large spacial and temporal energy concentration in a pulse emission period of one picosecond or less, and projects a mask pattern with a projection lens onto a work piece almost transparent to the wavelength of the laser beam for sublimation processing thereof, comprises the following steps of: setting the focal point of projecting an image of the mask pattern on the surface of a contour boundary of the opposite side of the work piece irradiated by the laser when the processing begins, and irradiating and converging the laser beam on the focal point portion so as to make the energy concentration thereof to be more than a threshold value enabling a designated ablative action to be generated; moving the work piece in the direction of laser irradiation gradually in a designated amount or at a designated speed in synchronism with the progress of ablation processing by the irradiation of the laser beam; and forming a structure on the work piece in the form of being inserted into and drawn from the contour boundary surface on the opposite side of the laser irradiation to the side of the laser irradiation.

(2) In the laser processing method referred to in paragraph (1), when a structure is processed in the interior of a work piece by performing sublimation processing, the structure is processed after a releasing outlet is formed in advance to release, externally, a substance produced by sublimate evaporation of the processing of the work piece.

(3) In the laser processing method referred to in paragraph (2), when the structure is processed, processing begins with the position of the structure being in contact with the releasing outlet.

(4) In the laser processing method referred to in paragraph (1), the laser oscillator is a laser oscillator provided with a space compression device for light propagation.

(5) In the laser processing method referred to in paragraph (4), the space compression device for light propagation comprises means for generating chirped pulses, and means for synchronizing a vertical mode utilizing a dispersion characteristic of the light wavelength.

(6) In the laser processing method referred to in paragraph (1), at the same time as the laser irradiation, processing is performed, while the mask pattern is dynamically changed in synchronism with the progress of the light ablation processing.

(7) In the laser processing method referred to in paragraph (6), means for dynamically changing the mask pattern is the light transmission mask of a liquid crystal device capable of controlling patterns dynamically.

(8) In the laser processing method referred to in paragraph (7), a laser beam incident upon the mask is linearly polarized light, and the polarization filter used for the liquid crystal device comprises only a single sheet light emission polarization filter vertical or horizontal to the polarizing direction of the incident laser beam corresponding to the setting of negative or positive transmission.

(9) A laser processing method, which uses a laser beam from a laser oscillator to emit, continuously, a light pulse having a large special and temporal energy concentration in a pulse emission period of one picosecond or less, and projects a mask pattern onto a work piece with a projection lens for the processing thereof, comprises the step of processing the work piece by changing the mask pattern dynamically in synchronism with the progress of processing the work piece by the use of a laser beam.

(10) In the laser processing method referred to in paragraph (9), the mask is the light transmission mask of a liquid crystal device capable of controlling patterns dynamically.

(11) In the laser processing method referred to in paragraph (9), a laser beam incident upon the mask is linearly polarized light, and the polarization filter used for the liquid crystal device comprises only a single sheet light emission polarization filter vertical or horizontal to the polarizing direction of the incident laser beam corresponding to the setting of negative or positive transmission.

(12) In the laser processing method referred to in paragraph (9), the focal point of the projected mask pattern image is focused on the processing position in the direction of an optical axis in synchronism with the progress of processing the work piece so as to displace the position of a mask or work piece to follow.

(13) In the laser processing method referred to in paragraph (9), the laser oscillator is a laser oscillator provided with a space compression device for light propagation.

(14) In the laser processing method referred to in paragraph (9), the space compression device for light propagation comprises means for generating chirped pulses, and means for synchronizing a vertical mode utilizing a dispersion characteristic of the light wavelength.

(15) A laser processing method, which uses a laser beam irradiated from a laser oscillator to emit, continuously, a light pulse having a large spacial and temporal energy concentration in a pulse emission period of one picosecond or less, comprises the following step of irradiating a laser beam onto a work piece having a multiply layered structure having different absorption characteristics of the laser beam wavelength; and processing the work piece with a designated pattern and designated energy concentration.

(16) In the laser processing method referred to in paragraph (15), the work piece having a multiply layered structure is a plate or structural body being semi-transparent tot he light wavelength of the laser beam, and formed by laminating or bonding a plurality of materials each having different light absorption characteristics.

(17) In the laser processing method referred to in paragraph (15), the light intensity distribution of the light pulse is a Gaussian beam.

(18) In the laser processing method referred to in paragraph (15), the laser oscillator is a laser oscillator provided with a space compression device for light propagation.

(19) In the laser processing method referred to in paragraph (18), the space compression device for light propagation comprises means for generating chirped pulses, and means for synchronizing a vertical mode utilizing a light dispersion characteristic of the light wavelength.

(20) A laser processing apparatus, which uses a laser beam from a laser oscillator to emit, continuously, a light pulse having a large spacial and temporal energy concentration in a pulse emission period of one picosecond or less, and projects a mask pattern onto a work piece with a projection lens for the processing thereof, comprises means for changing the mask pattern dynamically in synchronism with the progress of processing the work piece by the use of a laser beam.

(21) I the laser processing apparatus referred to in paragraph (20), the means for changing a mask pattern dynamically is a light transmission mask capable of controlling a pattern dynamically by use of a liquid crystal device.

(22) In the laser processing apparatus referred to in paragraph (21), a laser beam incident upon the mask is linearly polarized light, and the polarization filter used for the liquid crystal device comprises only a single sheet light emission polarization filter vertical or horizontal to the polarizing direction of the incident laser beam corresponding to the setting o negative or positive transmission.

(23) In the laser processing apparatus referred to in paragraph (21), the laser oscillator is a laser oscillator provided with a space compression device for light propagation.

(24) In the laser processing apparatus referred to in paragraph (23), the space compression device for light propagation comprises means for generating chirped pulses, and means for synchronizing a vertical mode utilizing a light dispersion characteristic of the light wavelength.

DETAILED DESCRIPTION OF THE PREFERRED EMBODIMENTS (First Embodiment)

In accordance with a first embodiment of the present invention to which the structure described above is applicable, the optical system of a laser processing method, in which laser is guided onto a work piece to perform light ablation processing by use of a laser beam form a laser oscillator that emits light pulses continuously with a large spatial and temporal energy concentration in a pulse emission period of one picosecond or less, is the one which performs laser pattern irradiation by projecting with a projection lens the mask pattern illuminated by the laser beam onto the work piece which is almost transparent to the laser beam wavelength. In this system, when the processing begins, the focal point of the projected image of the mask pattern is set on the surface of a contour boundary on the side of the work piece opposite to the work piece side where the laser is irradiated. Then, the energy concentration is converged on the focal point to be more than the threshold value that enables a designated ablation action to be generated, and in synchronism with the progress of ablation processing by laser irradiation, the work piece moves gradually in a designated amount or at a designated speed in the direction of laser irradiation. In this manner, a structure is formed on the work piece in the form of being inserted into the side of the contour boundary surface which is the opposite side of laser irradiation, and drawn to the laser irradiation side. Also, this laser processing method is applicable to processing a micro-three dimensional structure, such as the ink passage structure of an ink jet recording head.

In this respect, the aforesaid laser used herein is the so-called femtosecond laser disclosed on pages 24 to 31 of the Generation and Compression of Ultrashort Light Pulse, Chapter 1: Elemental Technologies of "the Compilation of Next Generation Optical Technologies" (published by the Optoelectornics Inc. in 1992) and others. With such a femtosecond laser as this, the temporal energy concentration becomes extremely large. Also, the irradiation period of the laser becomes extremely short. Therefore, the ablation processing is completed by a sublimation process before the laser beam is diffused in a work piece as thermal energy to make a highly precise processing possible. In performing this processing, there occurs no fusion that may cause deformation of the processed shape.

For example, some of the extremely short pulse laser oscillators generally used, which are currently available on the market, provide a pulse emission time of 150 femtoseconds or less with the light energy per pulse being 800 microjouls, that is, the energy concentration of an irradiated laser beam is at an oscillation pulse level of approximately 5.3 gigawatts.

With the characteristics of the aforesaid laser, the concentration of light energy reaches the gigawatt range, which is 100 times or more that of the YAG laser, even on an almost transparent work piece material, such as quartz, glass, or crystal, having a low light absorption. As a result, with the temporal and spatial concentration of energy, processing becomes possible locally so that if only there is absorption on the order of 0.1 to 1%, such a material as almost transparent quartz, glass, or crystal can be processed.

Here, however, an inner processing is performed only after having secured an air escape passage in order to release the sublimated gas from the work piece material externally. Unless the air escape passage is secured, the pressure of the sublimated gas from the work piece becomes high in the interior thereof, and a problem is encountered that the work piece is broken or cracked.

Also, with the light wavelength of the laser beam, the sublimation processing is possible only when it is converged in the interior of a transparent work piece in such an energy concentration as to exceed the threshold value of ablation processing thereof. Here, in reality, the processing threshold value of the energy concentration is extremely high, and it must satisfy the following conditions (1) and (2) to make processing possible:

Condition (1): the work piece is required to be transparent to the wavelength of the laser beam so that the laser beam can enter the interior of the work piece. With the perfect transmittance (there is no perfect transmittance in reality), processing is impossible because no absorption of the laser beam takes place. A light absorption of approximately 0.1% or more is needed with respect to the wavelength of the laser beam.

Condition (2): Even with a light absorption of 0.1%, the energy concentration is required for the laser beam to enable the energy concentration to reach the threshold value of sublimation processing. For example, if polysulfone resin is used as the work piece material, the ablation processing threshold value is such as to absorb an energy concentration of approximately 15 megawatts per $cm^2$. Then, as the sublimation processing is performed in the region having the energy concentration more than that value, the irradiation energy concentration of the laser beam requires an energy concentration of 15 gigawatts per $cm^2$ for the actual processing, because polysulfone is colorless and transparent in the region from the visible light to the near infrared light, and the light absorption is approximately 0.1% if the wavelength of the laser beam is 775 nm. In other words, for the aforesaid ultrashort pulse oscillating laser, it becomes possible to perform simultaneous processing in the region of 6 m square (36 $mm^2$) at the maximum for the inner processing of polysulfone with the energy concentration of 15 gigawatts per $cm^2$.

Hereinafter, with reference to the accompanying drawings, the description will be made of a first embodiment of the present invention.

Now, a laser processing method will be described in detail in accordance with the present embodiment, with is the principal part of the present invention.

Figure 1:
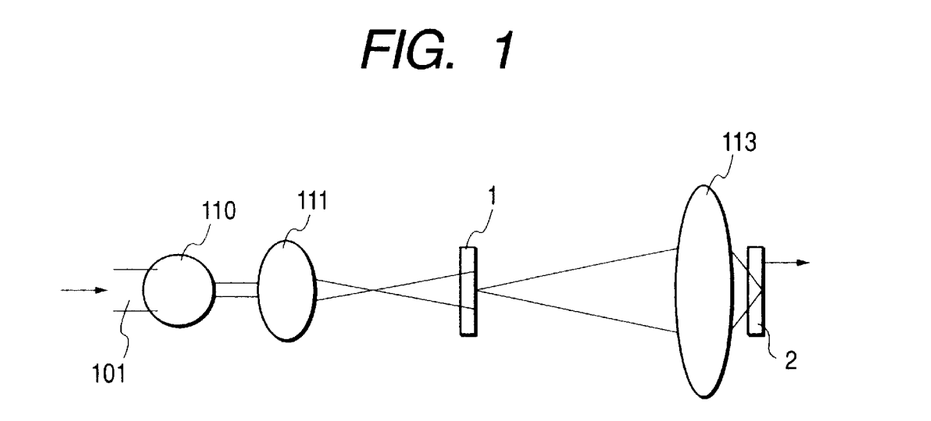
FIG. 1 is a view which schematically shows the optical path for the illustration of a laser processing method in accordance with a first embodiment of the present invention.

FIG. 1 is a view which schematically shows an optical path for the illustration of the laser processing method of the invention.

The laser luminous flux 101, which is emitted from the short pulse oscillating laser main body (not shown) in the direction indicated by an arrow in FIG. 1, is guided to a zoom beam compressor 110 to convert it into the beam diameter of designated light, and then, guided to a mask illumination lens 111 to form a laser beam having a designated convergent angle, thus illuminating the mask pattern portion of a mask 1. Then, the laser beam that has passed the mask pattern is irradiated for focusing projection by means of a projection lens 113 in such a sate that the patterned image transmits a work piece 2 to the opposite side of the surface where the laser is irradiated on the work piece 2 which is almost transparent to the wavelength of the laser beam. Thus, the ablation processing begins in the vicinity of the focused portion where the laser light energy concentration is intensified to be more than the threshold value that enables a designated ablative action to be generated. Then, in synchronism with the ablation processing by the irradiation of the laser beam, the work piece 2 is moved gradually in a designated amount or at a designated speed in the direction indicated by the other arrow in FIG. 1 by means of the controlled movement of an automatic stage (not shown). In this way, the ablation processing proceeds on the work piece 2, which is in the form of being drawn therefrom. When the designated shape is formed by the ablation processing, the irradiation of the laser 101 is suspended, hence, forming the structure of a designated shape on the work piece 2.

Figure 2A:
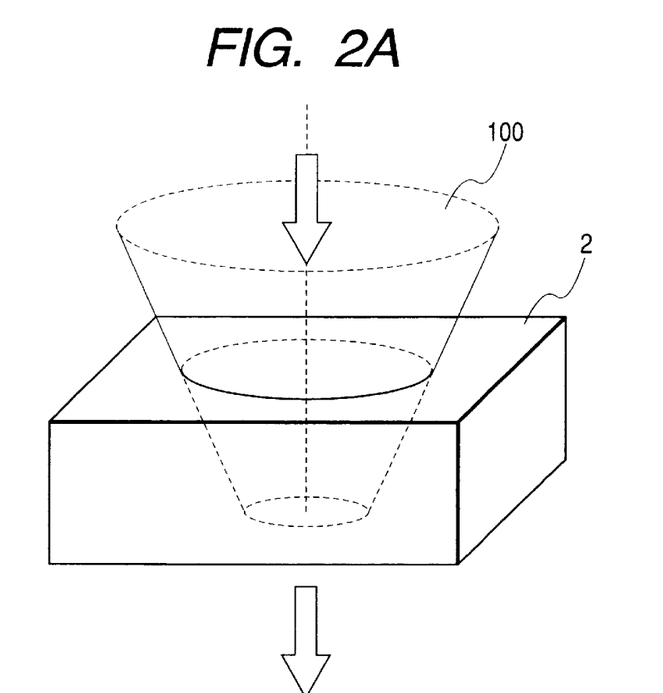
FIGS. 2A and 2B are views which illustrate the example of laser processing in accordance with the first embodiment of the present invention.
Figure 2B:
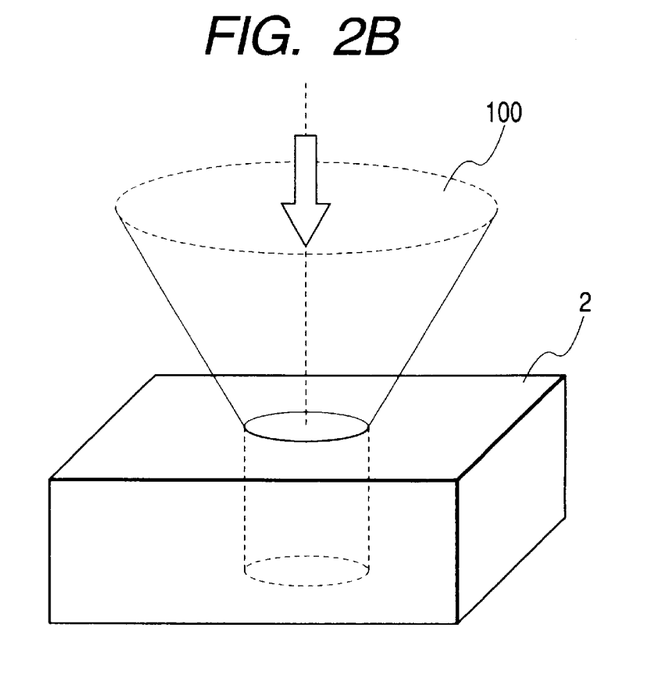

Now, the outline of the method for processing a cylindrical hollow shape having a high aspect ration will be described in conjunction with FIGS. 2A and 2B as an example. In FIG. 2A, the laser luminous flux is emitted from the laser oscillator (now shown) which emits a laser beam in an extremely short pulse period (one picosecond or less). The laser luminous flux 100 is irradiated in a state that it passes the circular pattern of the mask 1 and transmits the work piece 2 to the side opposite to the side where the laser is irradiated on the work piece 2 (hereinafter, this side is referred to as a back side), and that the mask pattern is projected for focusing with the high energy concentration which is more than the ablation threshold value. In this way, the ablation processing begins only on the back side of the work piece 2 where the energy is concentrated. Then, in synchronism with the progress of the ablation processing by the irradiation of the laser beam, the work piece 2 moves gradually in a designated amount or at a designated speed by means of controlled movement of an automatic stage (not shown), thus moving it to the condition shown in FIG. 2B lastly where the ablation processing is performed on the work piece 2, which is in the form of being drawn therefrom. In this manner, the cylindrical hollow shape, namely, the locus of the projected mask pattern image, which has moved at the focal point, is processed for the formation thereof.

As is clear from the above description, the work piece, which is almost transparent to the wavelength of the laser beam, can be processed by ablation in the form of being drawn therefrom. Thus, in principle, there is no restriction with respect to the distance in which the focal point moves. As a result, in accordance with the laser processing method of the present embodiment, it is possible to process and form a cylindrical hollow shape having an extremely high aspect ration on a work piece which is almost transparent to the wavelength of the laser beam. Also, by setting the mask pattern arbitrarily, columns can be processed in various shapes.

As described above, in accordance with the present invention, the focal point of the projected mask pattern image is set on the surface of a contour boundary which is opposite to the side where the laser is irradiated on the work piece by use of the laser that oscillates short pulses when processing begins, and at the same time, irradiation is converged on the focal point portion so that the light energy concentration of the laser becomes more than the threshold value that enables a designated ablative action to be generated. Then, in synchronism with the progress of the ablation processing by the irradiation of the laser beam, the work piece moves gradually in the direction of laser irradiation in a designated amount or at a designated speed, and a structure is processed by ablation on the work piece in the form of being drawn from the contour boundary surface which is the opposite side of the laser irradiation. With this arrangement, there is, in principle, no restriction on the distance in which the focal point moves to make it possible to process and form not only a hollow circular column shape or the like having an extremely high aspect ratio on the work piece which is almost transparent to the laser beam wavelength, but also, to process various column shapes with the mask pattern that can be set arbitrarily. As a result, in accordance with the present invention, a structure can be formed in a simple step of irradiating an extremely short pulse laser without using any complicated processing steps such as are needed for lithographic processing steps, hence, materializing a laser processing method for performing microprocessing of a three-dimensional structure with ease.

(Second Embodiment)

In accordance with a second embodiment of the present invention, the optical system of irradiating a laser onto a work piece in a laser processing method, in which light ablation processing is performed by use of a laser beam from a laser oscillator that emits continuously light pulses with a large spatial and temporal energy concentration in a pulse emission period of one picosecond or less, is the one which irradiates a laser pattern by projecting by use of a projection lens the patterns of a mask illuminated by a laser beam to the work piece which is almost transparent to the laser beam wavelength. In this system, the focal point of the projected image of the mask pattern is set on the surface of a contour boundary on the side opposite to the work piece where the laser is irradiated. Then, the energy concentration is converged on the focal point to be more than the threshold value that enables a designated ablation action to be generated, and in synchronism with the progress of ablation processing by laser irradiation, the work piece moves gradually in a designated amount or at a designated speed in the direction of laser irradiation. In this manner, a structure is formed on the work piece in the form of being inserted to the side of the contour boundary surface which is opposite to the side where the laser is irradiated, and drawn to the laser irradiation side. At the same time, the mask pattern is dynamically changed for processing in synchronism with the progress of the light ablation processing, thus making it possible to form the structure of a designated three-dimensional shape on the work piece. Also, this laser processing method is applicable to processing a micro-three dimensional structure, such as the ink passage structure of an ink jet recording head.

Here, the excimer laser which has been used conventionally for ablation processing is an ultraviolet laser beam. Therefore, it is impossible to use the light transmitting mask or the like prepared by a liquid crystal device which makes patterns controllable by changing the mask pattern dynamically.

Hereinafter, with reference to the accompanying drawings, a laser processing method will be described in accordance with the second embodiment of the present invention.

Now, a detailed description will be made of the laser processing method of the present embodiment, which is the principal part of the present invention.

Figure 3:
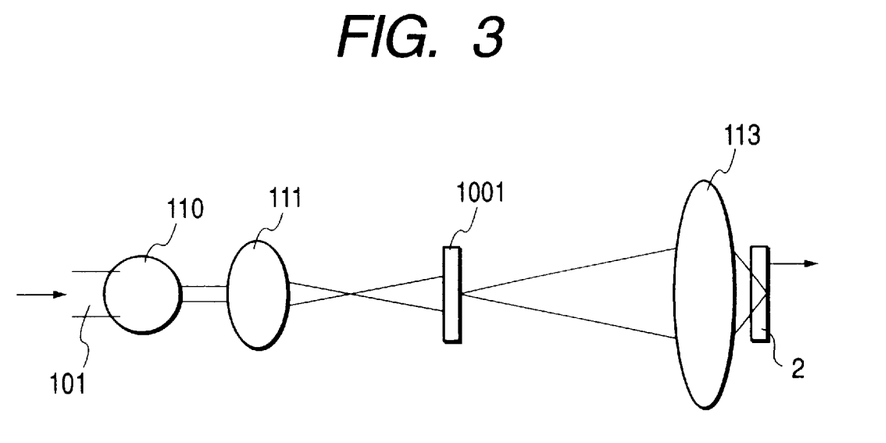
FIG. 3 is a view which schematically shows the optical path for the illustration of a laser processing method in accordance with a second embodiment of the present invention.

FIG. 3 is a view which schematically shows the optical path for the illustration of the laser processing method of the invention.

The laser luminous flux 101, which is emitted from a short pulse oscillating laser main body (not shown) in the direction indicated by an arrow in FIG. 3, is guided to a zoom beam compressor 110 to convert it into a beam diameter of designated light, and then, guided to a mask illumination lens 111 to form a laser beam having a designated convergence angle, thus illuminating the mask pattern portion of a liquid crystal mask 1001. Then, the laser beam, which has passed the mask pattern in the state where the liquid crystal transmitting mask pattern is set to be a designated pattern on the liquid crystal mask 1001, is irradiated for focusing projection by means of a projection lens 113 in such a state that the patterned image transmits a work piece 2 to the opposite side of the surface where the laser is irradiated on the work piece 2 which is almost transparent to the wavelength of the laser beam. Thus, the ablation processing begins in the vicinity of the focused portion where the laser light energy concentration is intensified to be more than the threshold value that enables a designated ablative action to be generated. Then, in synchronism with the ablation processing by the irradiation of the laser beam, the work piece 2 is moved gradually in a designated amount or at a designated speed in the direction indicated by the other arrow in FIG. 3 by means of the controlled movement of an automatic stage (not shown). In this way, the ablation processing makes progress on the work piece 2 which is in the form of being drawn therefrom. Here, meanwhile, with the liquid crystal mask 1001, the ablation processing also advances while changing the light transmitting mask pattern dynamically by means of the control of a liquid crystal driver (not shown). When the designated shape is formed by the ablation processing, the irradiation of laser 101 is suspended or the pattern of the liquid crystal mask 1001 is controlled to be in the state of transmitting no light, hence, forming the structure of a designated shape on the work piece 2.

Figure 4A:
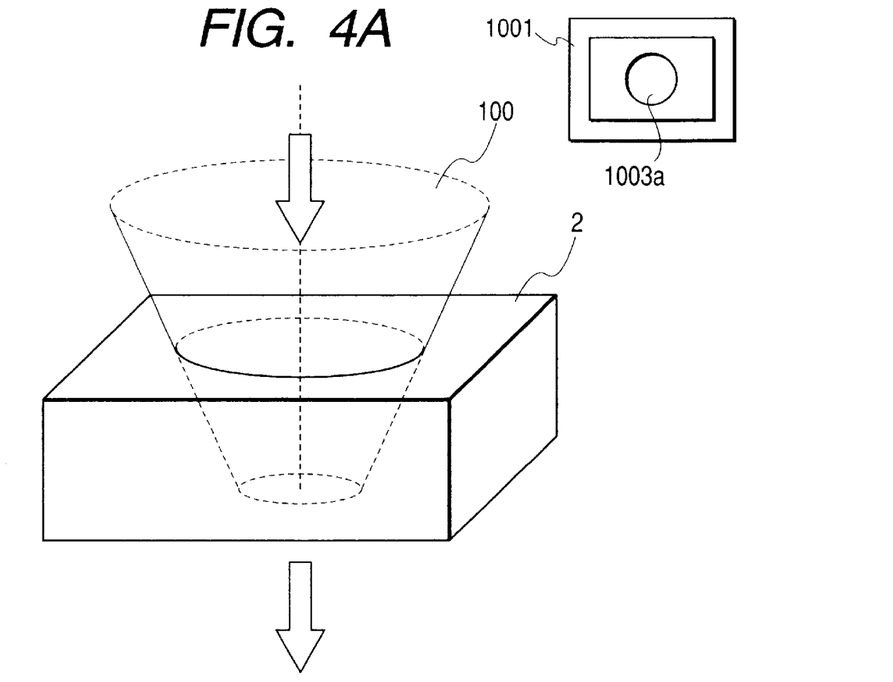
FIGS. 4A and 4B are views which illustrate the example of laser processing in accordance with the second embodiment of the present invention.
Figure 4B:
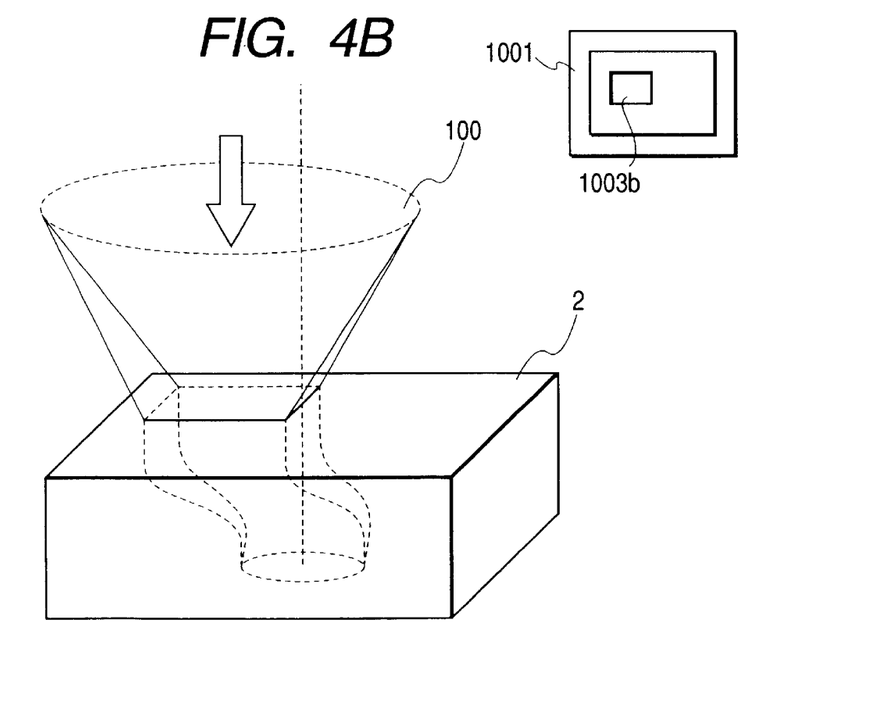

Now, in conjunction with FIGS. 4A and 4B, a description will be made of the outline of the method for processing a structure having a freely curved surface, which changes continuously from a circle to a square as an example. In FIG. 4A, the laser luminous flux is emitted from the laser oscillator (not shown) which emits a laser beam in an extremely short pulse period (one picosecond or less). The laser luminous flux 100 is irradiated in a state that it passes the circular pattern 1003a represented on the liquid crystal mask 1001 and transmits the work piece 2 on the side opposite to the side where the laser is irradiated on the work piece 2 (hereinafter, this side is referred to as a back side), and that the mask pattern is projected for focusing with the high energy concentration which is more than the ablation threshold value. In this way, the ablation processing begins only on the back side of the work piece 2 where the energy is concentrated. Then, in synchronism with the progress of the ablation processing the by irradiation of the laser beam, the work piece 2 moves gradually in a designated amount or at a designated speed by means of controlled movement of an automatic stage (not shown), and also, in synchronism with the progress of the ablation processing, the representation of the circular pattern of the liquid crystal mask 1001 dynamically changes to the representation of the square pattern 1003*b* as the time elapses through the free shape patterning representation, thus moving it to the condition shown in FIG. 4B lastly where the ablation processing is performed on the work piece 2, which is in the form of being drawn therefrom. In this manner, a structure is processed and formed with the freely curved shape which changes from a circle to a square continuously, that is, the locus of the projected mask pattern image on which it has moved at the focal point.

As is clear form the above description, the work piece which is almost transparent to the laser beam wavelength can be processed by ablation in the form of being drawn therefrom. Thus, in principle, there is no restriction with respect to the distance in which the focal point moves. Therefore, in accordance with the laser processing method of the present embodiment, it is possible to process and form a shape having an extremely high aspect ratio. Also, using the mask that enables mask patterns to be changed dynamically, it becomes possible to process three-dimensional structures in various forms by being linked with the laser irradiation processing step for the required operation.

Also, in this case, there is no restriction on the processing shapes, because the work piece, which is almost transparent to the laser beam wavelength, is processed by ablation in the form of being drawn therefrom. Here, no restriction is imposed, such as the inability to process the undercut (that is, the portion of a structure where a shadow is made), in carrying out the so-called deep cut etching. As a result, there is characteristically no drawback encountered such as to necessitate the provision of taper in the depthwise direction of a processing shape.

As described above, in accordance with the present invention, the foal point of the projected mask pattern image is set on the surface of a contour boundary which is opposite to the side where the laser is irradiated on the work piece by use of the laser that oscillates short pulses when processing begins, and at the same time, irradiation is converged on the focal point portion so that the light energy concentration of the laser becomes more than the threshold value that enables a designated ablative action to be generated. Then, in synchronism with the progress of the ablation processing by the irradiation of the laser beam, the work piece moves gradually in the direction of the laser irradiation in a designated amount or at a designated speed, and a structure is processed by ablation on the work piece in the form of being inserted to the side of the contour boundary surface which is the side opposite to the laser irradiation, and drawn to the laser irradiation side. At the same time, the mask pattern is dynamically changed for processing in synchronism with the progress of the light ablation processing, thus making it possible to form the structure of a designated three-dimensional shape on the work piece. With this arrangement, there is, in principle, no restriction on the distance in which the focal point moves to make it possible to process and form a shape having an extremely high aspect ration on the work piece which is almost transparent to the laser beam wavelength. Also, with the mask pattern that changes dynamically, it becomes possible to process three-dimensional structures in various shapes. As a result, in accordance with the present invention, a structure can be formed in a simple step of irradiating an extremely short pulse laser without using any complicated processing steps such as are needed for a lithographic process, hence, materializing a laser processing method for performing micro-processing of a three-dimensional structure with ease.

(Third Embodiment)

In accordance with a third embodiment of the present invention, a laser processing apparatus, which processes a work piece by projecting the mask pattern thereto by use of a projection lens with the laser beam from a laser oscillator that emits light pulses continuously with a large spatial and temporal energy concentration in the pulse emission period of one picosecond or less, uses a light transmission mask or the like using a liquid crystal device which is able to control the patterns dynamically. With the mask thus arranged, the work piece is processed by ablation in accordance with the mask pattern that changes as the time elapses in synchronism with the progress of the light ablation processing, while dynamically changing the pattern of a transmitted laser beam. In this manner, a structure of a designated three-dimensional shape can be processed and formed on a work piece by use of such a laser processing apparatus and laser processing method. Also, the laser processing apparatus and laser processing method are applicable to processing a micro-three dimensional structure, such as the ink passage structure of an ink jet recording head.

Hereinafter, with reference to the accompanying drawings, a description will be made of a third embodiment in accordance with the present invention.

Now, hereunder, a laser processing apparatus will be described in accordance with the present embodiment, which is a principal part of the invention.

Figure 5:
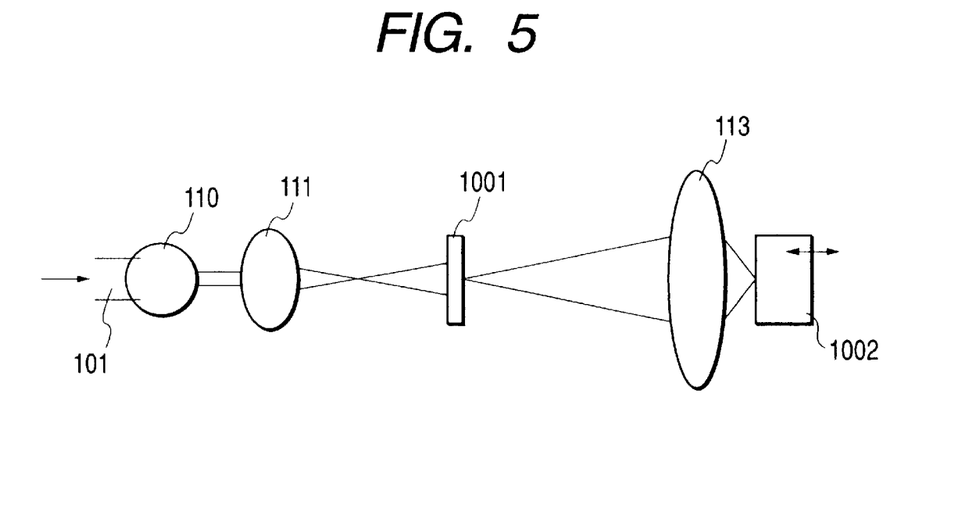
FIG. 5 is a view which schematically shows the optical path of a laser processing apparatus in accordance with a third embodiment of the present invention.

FIG. 5 is a view which schematically shows the optical path of the laser processing apparatus of the invention.

The laser luminous flux 101, which is emitted from the laser main body (not shown) that oscillates short pulses in the direction indicated by an arrow in FIG. 5, is guided to a zoom beam compressor 110 to convert it into the beam diameter of designated light, and then, guided to a mask illumination lens 111 to form a laser beam having a designated convergent angle, thus illuminating the mask pattern portion of a liquid crystal mask 1001.

Then, in the state where the liquid crystal mask 1001 has the liquid crystal transmission mask pattern to be set at a designated pattern, the laser beam that has passed the mask pattern is irradiated on the surface of a work piece 1002 for focusing projection by means of a projection lens 113 in such a state that the patterned image transmits a work piece 1002, and the ablation process begins by the laser oscillation. Then, at the same time that the laser beam is irradiated, the liquid crystal mask 1001 enables the ablation process to progress, while dynamically changing the light transmission pattern by use of the control of a liquid crystal driver (not shown). Also, the work piece 1002 is positioned in the direction indicated by the other arrow in FIG. 5 by means of an automatic stage (not shown) so that the projection image of the liquid crystal light transmission mask pattern is focused on the processing portion thereof.

When the designated shape is formed by the ablation processing, the irradiation of laser 101 is suspended or the pattern of the liquid crystal mask 1001 is controlled to be in the state of non-light transmission, hence forming the structure of a designated shape on the work piece 1002.

Figure 6A:
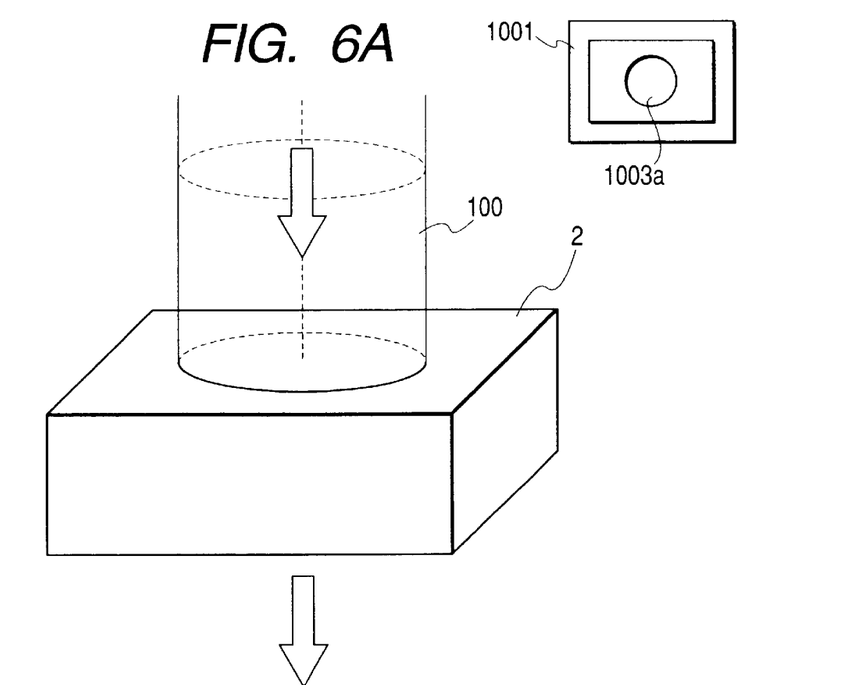
FIGS. 6A and 6B are views which illustrate the example of laser processing in accordance with the third embodiment of the present invention.
Figure 6B:
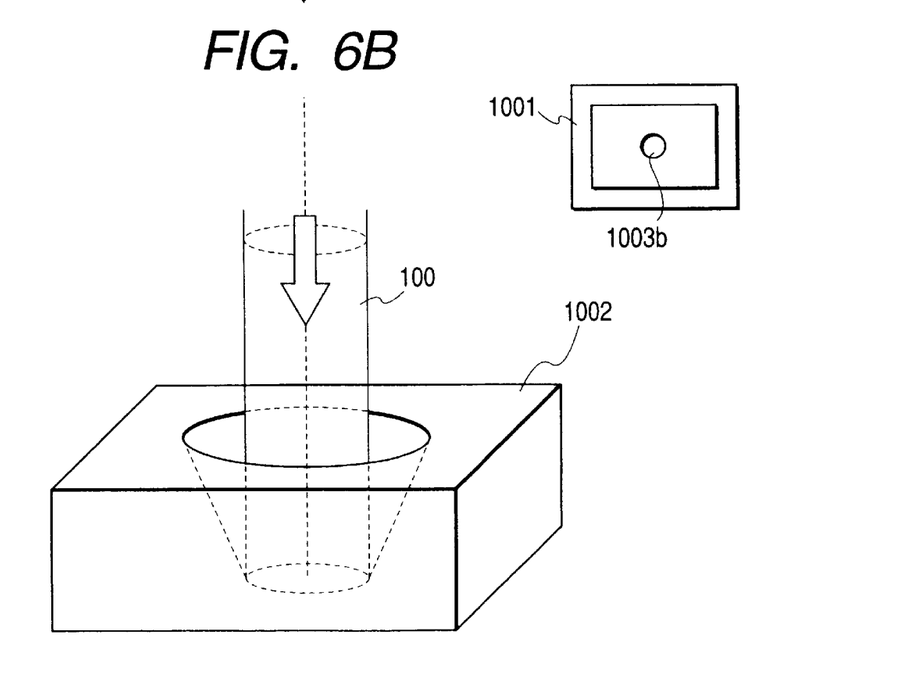

Now, a description will be made of the outline of the method for processing a conical hollow shape in conjunction with FIGS. 6A and 6B as an example. In FIG. 6A, the laser beam is emitted from the laser oscillator (not shown) which emits a laser beam in an extremely short pulse period (one picosecond or less), and passes the circular pattern 1003a of the liquid crystal mask 1001, thus irradiating on the surface of the work piece 1002 the laser luminous flux 100 having the energy concentration which is sufficiently higher than the ablation threshold value of the work piece 1002. In this manner, the ablation etching begins on the work piece 1002. Then, at the same time, the mask pattern is dynamically changed to make the radius of the circular pattern of the liquid crystal mask 1001 smaller, thus forming the circular pattern 1003b. Then, the conical hole is processed on the work piece 1002 in the tapered shape as shown in FIG. 6B.

It is clear from the above description that in accordance with the present embodiment, the mask that changes a pattern dynamically is used and linked with the laser etching step for operation to make it possible to process structures of various three-dimensional shapes.

As described above, in accordance with the present invention, the laser beam is emitted from a laser oscillator that emits a light pulse with a large spatial and temporal energy concentration in a pulse emission period of one picosecond or less. Then, when laser processing is performed using a laser beam with the projection of a mask pattern onto a work piece by use of a projection lens, the mask pattern changes dynamically in synchronism with the progress of processing of the work piece by the laser beam. Thus, ablation processing is effectuated on the work piece in accordance with the mask pattern that may change as time elapses. In this manner, the structure of a designated three-dimensional shape can be processed and formed on the work piece. Therefore, in accordance with the present invention, it is possible to form a structure in a simple step of extremely short pulse laser irradiation, hence, materializing a laser processing apparatus and method capable of microprocessing structures of three-dimensional shapes without using any complicated lithographic processes.

(Fourth Embodiment)

In accordance with a fourth embodiment of the present invention, the laser beam, which is output from a laser oscillator that outputs a laser beam in a pulse emission period of one picosecond or less, is irradiated to a plate or a structural body formed by laminating or bonding a plurality of materials which are almost transparent to the light wavelength of the laser beams, but having different light absorption characteristics through a designated pattern with a designated energy concentration, thus processing and forming the desired structure on the aforesaid plate or structural body. Here, it becomes possible to process the portion provided with the light energy concentration which is more than the ablation processing threshold value of each material owing to the relationship between the light intensity distribution of the laser beam and the laser beam absorption of each of the materials which are complexly used.

In this manner, the light intensity distribution pattern of the irradiating laser luminous flux, the energy concentration of the laser beam, and the arrangement of materials each having different light absorption characteristics of the irradiated laser beam are considered for designing depending on objectives to make it possible to perform microprocessing of structures of various three-dimensional shapes. Also, this laser processing method is applicable to processing the ink passage of an ink jet recording head or the like which is an extremely minute three-dimensional structure.

Hereinafter, with reference to the accompanying drawings, a description will be made of a fourth embodiment in accordance with the present invention.

Figure 7:
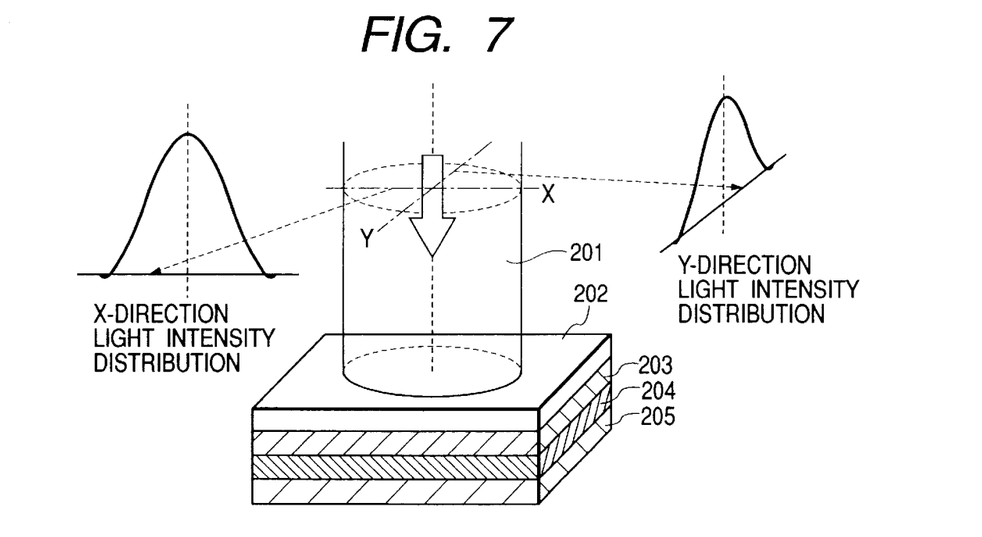
FIG. 7 is a view which schematically shows the optical path for the illustration of a laser processing method in accordance with a fourth embodiment of the present invention.
Figure 8A:
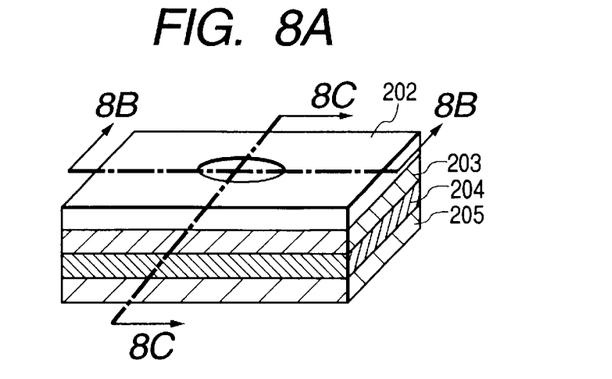
FIGS. 8A, 8B and 8C are views which illustrate the example of a processed shape formed by laser processing in accordance with the fourth embodiment of the present invention.
Figure 8B:
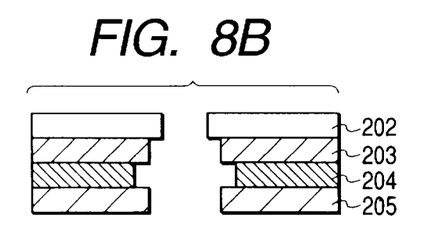
Figure 8C:
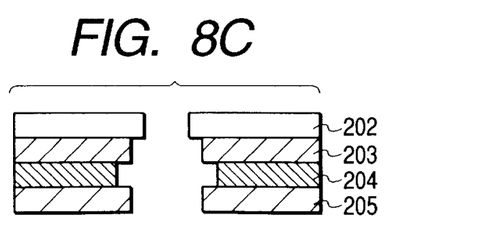

At first, in conjunction with FIG. 7, the outline of the processing method of the invention will be described. The laser beam 201 is emitted from a laser oscillator (not shown) that emits a laser beam in an extremely short pulse emission period (one picosecond or less) with a Gaussian beam intensity profile, and irradiated to the surface of an A layer 202 of a work piece structured with multiple layers, which is a polysulfone layer colored to provide approximately a 5% absorption of the laser beam wavelength. In this way, the laser beam receives Fresnel reflection of approximately 5% on the surface of the A layer 202. Thus, the A laser 202 absorbs 5% energy, and the laser beam of the remaining 90% is transferred to a B layer 203, which is a polysulfone layer colored to provide approximately 20% absorption of the laser beam wavelength. Then, the B layer 203, C layer 204, and D layer 205 is approximately 15 megawatts/cm$^2$, approximately 54 megawatts/cm$^2$, approximately 108 megawatts/cm$^2$, and approximately 33 megawatts/cm$^2$, respectively. Here, owing to the irradiation of the Gaussian beam intensity profile, the irradiating region where the energy concentration is more than the ablation threshold value becomes wider in the order of the A layer 202, D layer 205, B layer 203, and C layer 204, because the ablation processing threshold value of the polysulfone resin is approximately 15 megawatts per cm$^2$. In other words, processing is carried out in such a configuration as shown in FIGS. 8A to 8C. Here, FIGS. 8B and 8C are cross-section views taken along line 8B—8B and line 8C—8C in FIG. 8A.

As is clear from the above description, in accordance with the present embodiment, it becomes possible to process structures of various three-dimensional shapes by irradiating laser beams having a designated laser beam intensity profile and laser irradiation energy concentration onto a plurality of materials each having a designated layer structure to provide different light absorption characteristics with respect to the irradiated laser beam.

In other words, processing of various shapes can be implemented easily as a matter of course, because each parameter of the arrangement of the material each having different light absorption characteristics with respect to the irradiated laser beam, the arrangement structure thereof, the laser beam intensity profile, and the laser irradiation energy concentration is simply an item to be considered for designing. Also, a work piece here is not necessary arranged to be a layered structure. A work piece may be made of materials which are freely bonded without any particular consideration such as to the presence or absence of superposition thereof.

As described above, in accordance with the present embodiment, it is possible to process the portion where the light energy concentration which is more than the ablation processing threshold value of each material by the application of the relationship between the distribution of the laser beam irradiation light intensities, and the laser beam absorption of each of the laminated materials. Then, it becomes possible to perform microprocessing of structures of various three-dimensional shapes by designing in accordance with the objectives of processing the distribution pattern of laser light flux irradiation intensities, and the arrangement of materials to be laminated, each having a different light absorption to the irradiating laser beam wavelength.

Therefore, in accordance with the present invention, a complex material can be processed of extremely short pulse laser irradiation without any complicated steps such as using lithographic processes, hence making it possible to materialize a method for processing a micro three-dimensional structure by use of a laser in a simple processing step with ease.

What is claimed is:

1. A laser processing method using laser beam from a laser oscillator to emit continuously a light pulse having a large spacial and temporal energy concentration in a pulse emission of a period of one picosecond or less, and projecting a mask pattern with a projection lens onto a work piece almost transparent to the wavelength of said laser beam for sublimation processing thereof, comprising the steps of:

setting the focal point of a projection image of said mask pattern on a surface of a contour boundary on the opposite side of said work piece irradiated by said laser when said processing begins, and irradiating and converging said laser beam on said focal point portion so as to make the energy concentration thereof to be more than a threshold value enabling designated ablative action to be generated;

moving said work piece in the direction of laser irradiation gradually in a designated amount or at a designated speed in synchronism with the progress of ablation processing by the irradiation of said laser beam; and forming structure on said work piece in the form of being inserted into and drawn from the contour boundary surface on the opposite side of laser irradiation to the side of said laser irradiation,wherein when a structure is processed in the interior of the work piece by sublimation in performing the sublimation processing of said work piece, said structure is processed after a releasing outlet is formed in advance to release externally substance produced by sublimate evaporation of said processing.

2. A laser processing method according to claim 1, wherein when said structure is processed, processing begins with the position of said structure being in contact with said releasing outlet.

3. A laser processing method according to claim 1, wherein said laser oscillator is a laser oscillator provided with a space compression device for light propagation.

4. A laser processing method according to claim 3, wherein said space compression device for light propagation comprises means for generating chirped pulses, and means for synchronizing vertical mode utilizing dispersion characteristic of light wavelength.

5. A laser processing method according to claim 1, wherein at the same time of said laser irradiation, processing is performed, while said mask pattern is dynamically changed in synchronism with the progress of said light ablation processing.

6. A laser processing method according to claim 5, wherein said mask pattern is dynamically changed by means of the light transmission mask of a liquid crystal device capable of controlling pattern dynamically.

7. A laser processing method according to claim 6, wherein laser beam incident upon said mask is linearly polarized light, and the polarization filter used for the liquid crystal device comprises only a single sheet light emission polarization filter vertical or horizontal to the polarizing direction of said incident laser beam corresponding to the setting of negative or positive transmission.

8. A laser processing method using a laser beam from a laser oscillator to emit continuously a light pulse having large spacial and temporal energy concentration in a pulse emission period of one picosecond or less, and projecting a mask pattern onto a work piece with a projection lens for the processing thereof, comprising the step of:

processing said work piece by changing said mask pattern dynamically in synchronism with the progress of processing said work piece by use of laser beam, wherein said work piece is processed in a three-dimensional shape in a manner that an irradiation area is changed by dynamically changing a mask pattern.

9. A laser processing method according to claim 8, wherein said mask is the light transmission mask of a liquid crystal device capable of controlling pattern dynamically.

10. A laser processing method according to claim 8, wherein a laser beam incident upon said mask is linearly polarized light, and the polarization filter used for the liquid crystal device comprises only a single sheet light emission polarization filter vertical or horizontal to the polarizing direction of said incident laser beam corresponding to the setting of negative or positive transmission.

11. A laser processing method according to claim 8, wherein the focal point of said projected mask pattern image is focused on the processing position in the direction of optical axis in synchronism with the progress of processing the work piece so as to displace the position of mask or work piece to follow.

12. A laser processing method according to claim 8, wherein said laser oscillator is a laser oscillator provided with a space compression device for light propagation.

13. A laser processing method according to claim 12, wherein said space compression device for light propagation comprises means for generating chirped pulses, and means for synchronizing vertical mode utilizing dispersion characteristic of light wavelength.

14. A laser processing method using a laser beam irradiated from a laser oscillator to emit continuously a light pulse having large spacial and temporal energy concentration in a pulse emission period of one picosecond or less, comprising the steps of:

irradiating laser beam onto a work piece having a multi-layered structure of different absorption of said laser beam wavelength; and processing said work piece with designated pattern and designated energy consumption.

15. A laser processing method according to claim 14, wherein said work piece having the multi-layered structure is a plate or structural body being semi-transparent to the light wavelength of said laser beam, and formed by laminating or bonding a plurality of materials each having different light absorption.

16. A laser processing method according to claim 14, wherein the light intensity distribution of said light pulse is Gaussian beam.

17. A laser processing method according to claim 14, wherein said laser oscillator is a laser oscillator provided with a space compression device for light propagation.

18. A laser processing method according to claim 17, wherein said space compression device for light propagation comprises means for generating chirped pulses, and means for synchronizing vertical mode utilizing light dispersion characteristic of light wave length.

* * * * *